US009818332B2

(12) United States Patent
Su

(10) Patent No.: US 9,818,332 B2
(45) Date of Patent: Nov. 14, 2017

(54) IMAGE DISPLAY METHOD AND ELECTRONIC DEVICE

(71) Applicant: Acer Incorporated, New Taipei (TW)

(72) Inventor: Chen-Kang Su, New Taipei (TW)

(73) Assignee: Acer Incorporated, New Taipei (TW)

( * ) Notice: Subject to any disclaimer, the term of this patent is extended or adjusted under 35 U.S.C. 154(b) by 186 days.

(21) Appl. No.: 14/845,292

(22) Filed: Sep. 4, 2015

(65) Prior Publication Data

US 2016/0093243 A1 Mar. 31, 2016

(30) Foreign Application Priority Data

Sep. 30, 2014 (TW) .............................. 103133957 A

(51) Int. Cl.
  *G09G 3/20* (2006.01)
  *H04N 5/232* (2006.01)
  *H04N 5/202* (2006.01)
  *H04N 5/58* (2006.01)

(52) U.S. Cl.
  CPC ........... *G09G 3/2003* (2013.01); *H04N 5/202* (2013.01); *H04N 5/23229* (2013.01); *H04N 5/58* (2013.01); *G09G 2320/0673* (2013.01); *G09G 2360/144* (2013.01); *G09G 2360/16* (2013.01)

(58) Field of Classification Search
  CPC ... G09G 2320/0276; G09G 2320/0673; G09G 2360/144; H04N 5/58
  USPC .......................... 345/102, 207, 690; 348/602
  See application file for complete search history.

(56) References Cited

U.S. PATENT DOCUMENTS

| 8,698,727 | B2 | 4/2014 | Herz et al. | |
|---|---|---|---|---|
| 2006/0033749 | A1* | 2/2006 | Yamada | G09G 3/20 345/595 |
| 2006/0268180 | A1* | 11/2006 | Chou | G06T 5/009 348/673 |
| 2010/0277452 | A1 | 11/2010 | Muraki | |
| 2011/0074805 | A1* | 3/2011 | Hwang | G09G 3/20 345/589 |
| 2011/0205397 | A1* | 8/2011 | Hahn | G06F 3/147 348/231.6 |
| 2014/0320552 | A1* | 10/2014 | Seo | G09G 3/3648 345/690 |

(Continued)

FOREIGN PATENT DOCUMENTS

| CN | 101236728 | 8/2008 |
|---|---|---|
| TW | 201423714 | 6/2014 |

*Primary Examiner* — Koosha Sharifi-Tafreshi
(74) *Attorney, Agent, or Firm* — JCIPRNET

(57) ABSTRACT

An image display method, adapted to an electronic device having a screen, an image capturing unit, and a light sensor, includes the following steps. A preview image captured by the image capturing unit is received and processed so as to generate a plurality of pixel luminance values of the preview image. A light illumination of an ambient light detected by the light sensor is received. An output Gamma lookup table among a plurality of Gamma lookup table is selected according to the pixel luminance values and the light illumination of the ambient light. An adjusted pixel luminance value corresponding to each of the pixel luminance values is generated based on the output Gamma lookup table so as to accordingly display the preview image on the screen with sunlight readability. An electronic device is further provided in the invention to implement the above method.

10 Claims, 2 Drawing Sheets

(56) References Cited

U.S. PATENT DOCUMENTS

2015/0070337 A1* 3/2015 Bell .................... G09G 3/2003
345/207

* cited by examiner

IMAGE DISPLAY METHOD AND ELECTRONIC DEVICE

CROSS-REFERENCE TO RELATED APPLICATION

This application claims the priority benefit of Taiwan application serial no. 103133957, filed on Sep. 30, 2014. The entirety of the above-mentioned patent application is hereby incorporated by reference herein and made a part of this specification.

BACKGROUND OF THE INVENTION

1. Field of the Invention

The present invention generally relates to an image display method and an electronic device, in particular, to an image display method and an electronic device with sunlight readability.

2. Description of Related Art

With development in technology, various mobile devices, such as tabular computers, personal digital assistants, and smart phones, have become indispensable tools for people nowadays. Besides, such mobile devices have been developed to provide versatile applications. For example, in terms of the multi-functionality, a smart phone provides communicating services as well as web services, e-book, gaming and photo-shooting features. In particular, the photo-shooting feature allows the user to capture instant moments and hence have become one of the most favored features.

However, when such mobile device is used for photo-shooting under the sunlight, a preview image may be hardly viewed by human eyes due to the reflection of the light incident to a screen of the mobile device. One of the existing solutions is to dynamically adjust the backlight and the digital contrast of the screen for improving its sunlight readability by an additional image processing hardware and an ambient light sensor. Another solution is to replace additional hardware cost by using computational and graphical analyzing abilities of an existing processor and graphics processing module (GPU). However, such approach may raise the power consumption of the mobile device and therefore reduce its battery life.

Accordingly, to present a screen display of such device with high quality under strong light has become one of the problems to be solved.

SUMMARY OF THE INVENTION

Accordingly, the present invention is directed to an image display method and an electronic device, which may improve the sunlight readability of a screen with no additional hardware cost and with minimal system usage.

The present invention is directed to an image display method adapted to an electronic device having a screen, an image capturing unit, and a light sensor. The method includes the following steps. A preview image captured by the image capturing unit is received and processed so as to generate a plurality of pixel luminance values of the preview image. A light illumination of an ambient light detected by the light sensor is received. Next, an output gamma lookup table is selected from a plurality of gamma lookup tables according to the pixel luminance values and the light illumination of the ambient light. An adjusted pixel luminance value corresponding to each of the pixel luminance values is generated based on the output gamma lookup table, and the preview image is accordingly displayed on the screen.

The invention is also directed to an electronic device having a screen, an image capturing unit, an image signal processing unit, a light sensor, and a controlling unit, where the image signal processing unit is coupled to the image capturing unit, and the controlling unit is coupled to the screen, the light sensor, and the image signal processing unit. The image capturing unit is configured to generate a preview image. The image signal processing unit is configured to process the preview image so as to generate a plurality of pixel luminance values of the preview image. The light sensor is configured to detect a light illumination of an ambient light. The controlling unit is configured to select an output gamma lookup table from a plurality of gamma lookup tables according to the pixel luminance values and the light illumination of the ambient light, and to generate an adjusted pixel luminance value corresponding to each of the pixel luminance values based on the output gamma lookup table so as to display the preview image on the screen accordingly.

In view of the foregoing, in the image display method and the electronic device proposed in the invention, before the user performs photo-shooting under strong light, a preview image is processed by the image signal processing unit to obtain a luminance distribution of the preview image, and the preview image is further adjusted based on a gamma lookup table corresponding to an ambient light. With no additional hardware cost and minimal system usage, when the electronic device is used for photo-shooting under strong light, the preview image with sunlight readability would be clearly displayed on the screen.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
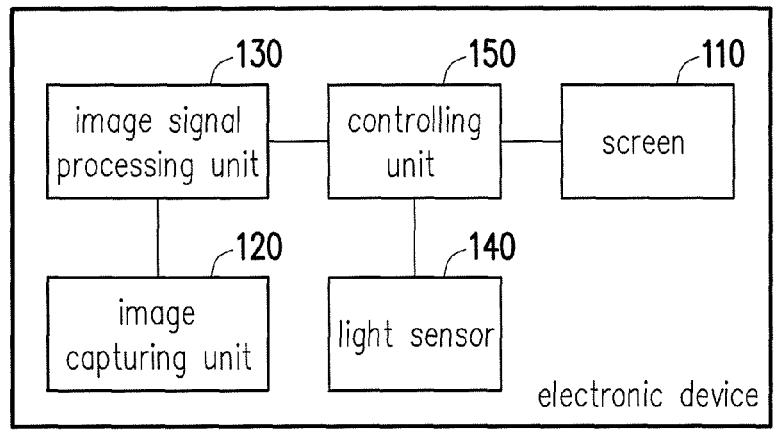
FIG. 1 illustrates a block diagram of an electronic device according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

A mobile device with a photo-shooting feature may include an image signal processor (ISP) for image signal processing (e.g. auto exposure, auto focus, auto white balance, and so forth). Additionally, the image signal processor may not only perform pre-processing, such as average luminance calculation and pixel luminance distribution analysis, on image signals, but may also perform color contrast, hue, saturation corrections on the image. The image display technique proposed in the invention is based on an image processing capability of the image signal processor and a simple computation. With no additional hardware cost and minimal system usage, when the electronic device is used for photo-shooting under strong light, the preview image with sunlight readability would be clearly displayed on the screen.

FIG. 1 illustrates a block diagram of an electronic device according to an embodiment of the invention. Referring to FIG. 1, an electronic device 100 may be a smart phone in the present embodiment. However, the electronic device 100 may also be other electronic devices such as a cell phone, a personal digital assistant, a personal digital assistant phone, a tabular computer, a laptop computer, and so forth. The electronic device 100 includes a screen 110, an image capturing unit 120, an image signal processing unit 130, a light sensor 140, and a controlling unit 150.

The screen 110 may be a liquid crystal display (LCD), a light-emitting diode (LED) display, a field emission display (FED), or other types of displays. The screen 110 is configured to display an image output by the electronic device 100 for the viewer.

The image capturing unit 120 may include a lens such as an optical prime lens or an optical zoom lens as well as sensing elements such as charge-coupled-device (CCD) elements. The image capturing unit 120 is configured to capture a preview image.

The image signal processing unit 130 is coupled to the image capturing unit 120 and may be an image signal processor (ISP). The image signal processing unit 130 is configured to receive and process the preview image so as to calculate a plurality of pixel luminance values of the preview image.

The light sensor 140 may be an ambient light sensor (ALS) and may be disposed on the same side as the screen 10. The light sensor 140 is configured to detect a light illumination of an ambient light in front of the screen 110.

The controlling unit 150 is coupled to the screen 110, the image signal processing unit 130, and the light sensor 140 and may be a graphic processing unit (GPU), a central processing unit (CPU), other programmable devices for general purpose or special purpose such as a microprocessor, a digital signal processor (DSP), a programmable controlling unit, an application specific integrated circuit (ASIC), a programmable logic device (PLD), or other similar devices or a combination of above-mentioned devices. The controlling unit 150 is configured to adjust the preview image according to the pixel luminance values of the preview image and the light illumination detected by the light sensor 140 for readability under strong light. An embodiment would be illustrated as follows.

Figure 2:
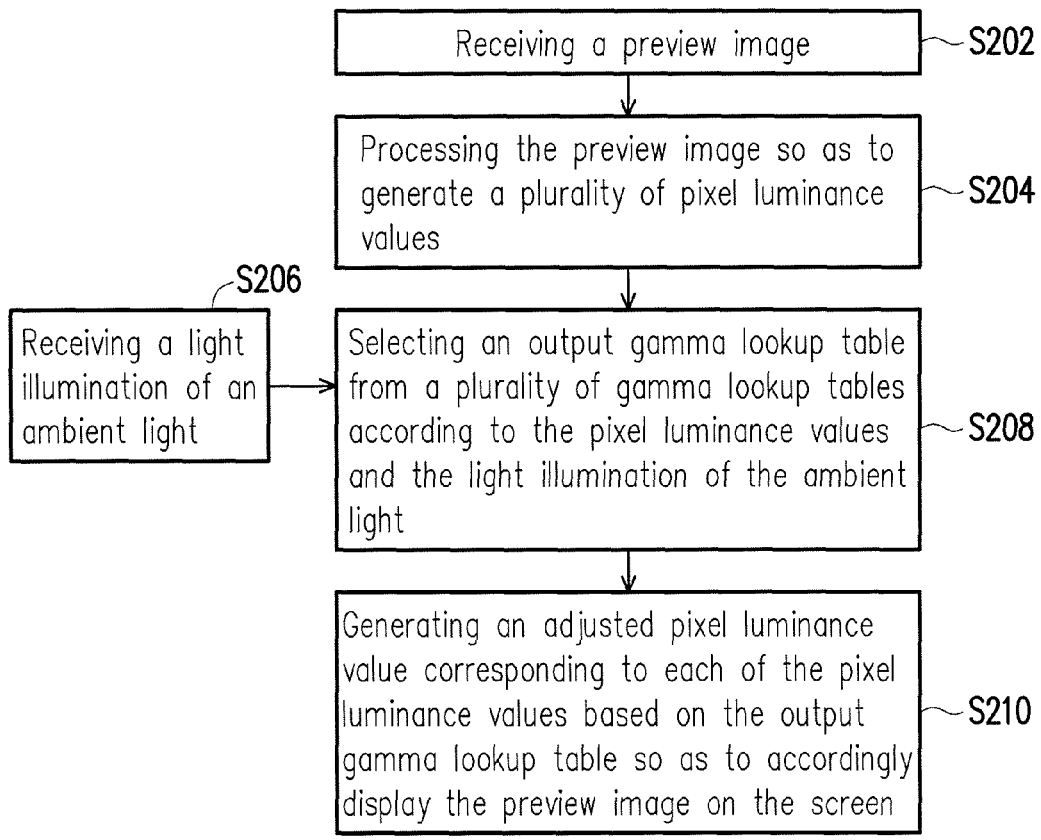
FIG. 2 illustrates a flowchart of an image display method according to an embodiment of the invention.

FIG. 2 illustrates a flowchart of an image display method according to an embodiment of the invention along with each of the components in FIG. 1.

Referring to both FIG. 1 and FIG. 2, the image signal processing unit 130 first receives a preview image captured by the image capturing unit 120 (Step S202) and processes the preview image so as to generate a plurality of pixel luminance values of the preview image (Step S204). To be specific, when the user wishes to capture a specific region, the image capturing unit 120 may capture the preview image of such region. Next, the image signal processing unit 130 may receive the preview image from the image capturing unit 120 and perform signal processing on the preview image so as to generate a luminance value of each pixel of the preview image, referred to as "pixel luminance values" herein.

Next, the controlling unit 150 receives a light illumination of an ambient light detected by the light sensor (Step S206). In the present embodiment, concurrently with the pixel luminance values being generated, the light sensor 140 may detect the light illumination of the ambient light, and the controlling unit 150 may then receive the light illumination of the ambient light. In another embodiment, Step S206 and Step S204 may not be necessarily to be performed concurrently. For example, the light sensor 140 may be turned on continuously during photo-shooting and may periodically detect the light illumination of the ambient light. The controlling unit 150 may receive the light illumination of the ambient light once it is detected.

Next, the controlling unit 150 selects an output gamma lookup table from a plurality of gamma lookup tables according to the pixel luminance values and the light illumination of the ambient light (Step S208). To be specific, the image signal processing unit 130 may generate a luminance distribution of the pixel luminance values. The luminance distribution may be presented as a histogram, where the pixel luminance values may be sorted and divided into a plurality of equally-spaced bins. As an example, for the pixel luminance values ranging between 0 and 255, the histogram may include 16 equally-spaced bins.

After the controlling unit 150 obtains the luminance distribution from the image signal processing unit 130, it may calculate a maximum luminance value, an average luminance value, and a minimum luminance value of the preview image. In the present embodiment, the controlling unit 150 may obtain the maximum luminance value, the average luminance value, and the minimum luminance value according to, for example, Eq.(1)-Eq.(3):

$$\bar{Y} = \frac{\sum_{i=1}^{n} N(i)G(i)}{\sum_{i=1}^{n} N(i)} \qquad \text{Eq. (1)}$$

$$Y_{max} = \{\max G(i) \mid N(i) > 0, 1 \le i \le n, i \in N\} \qquad \text{Eq. (2)}$$

$$Y_{min} = \{\min G(i) \mid N(i) > 0, 1 \le i \le n, i \in N\} \qquad \text{Eq. (3)}$$

where $\bar{Y}$ represents the average luminance value, $Y_{max}$ represents the maximum luminance value, $Y_{min}$ represents the minimum luminance value; i represents a bin number and is a positive value, where $1 \le i \le n$, and n is the total number of the bins; G(i) represents the pixel luminance value corresponding to the bin i, and N(i) represents the number of the pixels corresponding to the bin i. The main idea of the present invention is to adaptively switch among different gamma lookup tables according to the average luminance value of the preview image and the light illumination of the ambient light so as to allow the readability of the preview image under a strong light condition.

To be specific, a plurality of different gamma lookup tables constructed according to different curves may be pre-stored in a storage unit (not shown) of the electronic device 100, where one of the gamma lookup tables may be selected by the controlling unit 150. When the electronic device 100 is used under strong light, if the preview image is a dark scene, the gamma lookup table adopted by the controlling unit 150 may increase the luminance of the dark pixels (i.e. the pixels with lower pixel luminance values) for improving their readability while the bright pixels may not be over-saturated; if the preview image is a bright scene, the gamma lookup table adopted by the controlling unit 150 may decrease the luminance of the dark pixels so as to enhance the contrast of the preview image; if the preview image is a normal scene, the gamma lookup table adopted by the controlling unit 150 may increase the luminance of the brighter pixels and decrease the luminance of the darker pixels so as to enhance the contrast of depth of field. For convenience sake, the gamma lookup table adopted by the controlling unit 150 is referred to as an "output gamma lookup table" hereinafter.

In the present embodiment, the gamma lookup tables include a first gamma lookup table, a second gamma lookup table, a third gamma lookup table, and a fourth gamma lookup table. The first gamma lookup table, the second gamma lookup table, and the third gamma lookup table may be constructed based on different gamma curves taken on different gamma values, where each of the gamma curves may be written as Eq.(4):

$$V_{out}=V_{in}^{\gamma} \quad \text{Eq.(4)}$$

where $V_{in}$ represents an input index of each of the gamma lookup tables and is a normalized pixel luminance value; $\gamma$ represents each of the gamma values; $V_{out}$ represents an output of each of the gamma lookup tables and is an adjusted pixel luminance value. The gamma values of the first gamma curve, the second gamma curve, and the third gamma curve may respectively satisfy the following conditions: $\gamma=1$, $\gamma<1$, and $\gamma>1$. The fourth gamma lookup table is constructed based on a sigmoid curve. In the present embodiment, the sigmoid curve may be written as Eq.(5):

$$V_{out} = \frac{1}{1+\exp(-0.015(V_{in}-128))} \quad \text{Eq. (5)}$$

where the range of an input index $V_{in}$ and an output $V_{out}$ of the fourth gamma lookup table is between 0 and 255.

Figure 3:
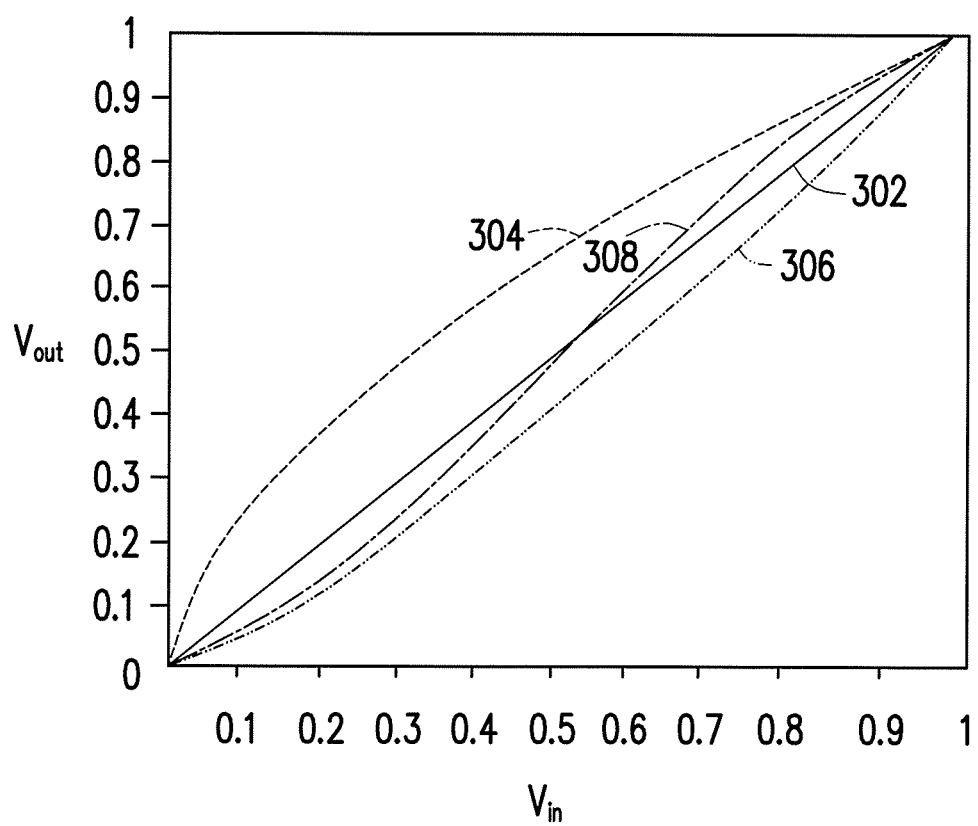
FIG. 3 illustrates a plurality of curves corresponding to a plurality of gamma lookup tables according to an embodiment of the invention.

To be specific, the aforesaid curves may be illustrated as a first gamma curve 302, a second gamma curve 304, a third gamma curve 306, and a sigmoid curve 308 in FIG. 3. When the controlling unit 150 determines that the light illumination of the ambient light is less than a light illumination threshold (e.g. 2000 lux), it indicates that the electronic device 100 is not under strong light and thus no pixel luminance values need to be adjusted. The controlling unit 150 may set the first gamma lookup table corresponding to the first gamma curve 302 as the output gamma lookup table. In other words, a linear relationship would exist between the pixel luminance values and the adjusted pixel luminance values.

When the controlling unit 150 determines that the light illumination of the ambient light is not less than the light illumination threshold, it indicates that the electronic device 100 is under strong light, and the controlling unit 150 would then select a gamma lookup table according to the average luminance pixel value of the preview image. When the controlling unit 150 determines that the average luminance value is less than a first luminance threshold (e.g. 64), it indicates that the preview image is a dark scene, and the controlling unit 150 would then adopt the second gamma lookup table corresponding to the second gamma curve 304 so as to increase the luminance of the darker pixels of the preview image for improving their readability. When the controlling unit 150 determines that the average luminance value is greater than a second luminance threshold (e.g. 196), it indicates that the preview image is a bright scene, and the controlling unit 150 would then adopt the third gamma lookup table corresponding to the third gamma curve 306 so as to decrease the luminance of the darker pixels for contrast enhancement. When the controlling unit 150 determines that the average luminance value is between the first luminance threshold and the second luminance threshold (e.g. between 64 and 196), it indicates that the preview image is a normal scene, and the controlling unit 150 would then adopt the fourth gamma lookup table corresponding to the sigmoid curve 308 so as to increase the luminance of the brighter pixels and decrease the luminance of the darker pixels for contrast enhancement of depth of field in the preview image.

Revisiting FIG. 2, after selecting the output gamma lookup table, the controlling unit 150 would generate an adjusted pixel luminance value corresponding to each of the pixel luminance values based on the output gamma lookup table so as to accordingly display the preview image on the screen 110 (Step S210). To be specific, the controlling unit 150 may first normalize the pixel luminance values according to the maximum luminance value and the minimum luminance value to generate a plurality of normalized pixel luminance values ranging between, for example, 0 and 1. The controlling unit 150 may input the normalized pixel luminance values to the output gamma lookup table, and the adjusted pixel luminance values corresponding to the normalized pixel luminance values may be output by the output gamma lookup table. Next, the controlling unit 150 may map the adjusted pixel luminance values to a display range of the screen 110 so as to display the preview image on the screen 110 accordingly. For example, the display range of the conventional screen 110 is between 0 and 255, and such range may be set according to user preference or the display range supported by the screen 110 itself. Accordingly, the preview image displayed in the screen 110 may be readable under strong light. It should be noted that, the input index and the output of the output gamma lookup table are between 0 and 1 in the present embodiment. However, in other embodiments, the input index and the output of the output gamma lookup table may be between 0 and 255. The invention is not limited herein.

In view of the foregoing, in the image display method and the electronic device proposed in the invention, before the user performs photo-shooting under strong light, a preview image is processed by the image signal processing unit to obtain a luminance distribution of the preview image, and the preview image is further adjusted based on a gamma lookup table corresponding to an ambient light. With no additional hardware cost and minimal system usage, when the electronic device is used for photo-shooting under strong light, the preview image with sunlight readability would be clearly displayed on the screen.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image display method, adapted to an electronic device having a screen, an image capturing device, and a light sensor, comprising:

receiving and processing a preview image captured by the image capturing device so as to generate a plurality of pixel luminance values of the preview image;

receiving a light illumination of an ambient light detected by the light sensor;

generating a luminance distribution of the pixel luminance values and calculating an average luminance value according to the luminance distribution;

selecting an output gamma lookup table from a plurality of gamma lookup tables according to the average luminance value and the light illumination of the ambient light; and generating an adjusted pixel luminance value corresponding to each of the pixel luminance values based on the output gamma lookup table so as to accordingly display the preview image on the screen.

2. The image display method according to claim 1, wherein before the step of receiving the preview image, the image display method further comprises:

constructing a first gamma lookup table among the gamma lookup tables according to a first gamma curve, wherein a gamma value of the first gamma curve is equal to 1;

constructing a second gamma lookup table among the gamma lookup tables according to a second gamma curve, wherein a gamma value of the second gamma curve is less than 1;

constructing a third gamma lookup table among the gamma lookup tables according to a third gamma curve, wherein a gamma value of the third gamma curve is greater than 1;

constructing a fourth gamma lookup table among the gamma lookup tables according to a sigmoid curve.

3. The image display method according to claim 2, wherein before the step of selecting the output gamma lookup table from the gamma lookup tables according to the pixel luminance values and the light illumination of the ambient light, the image display method further comprises:

calculating a maximum luminance value and a minimum luminance value according to the luminance distribution.

4. The image display method according to claim 3, wherein the step of selecting the output gamma lookup table from the gamma lookup tables according to the pixel luminance values and the light illumination of the ambient light comprises:

when the light illumination of the ambient light is less than a light illumination threshold, setting the first gamma lookup table as the output gamma lookup table; and when the light illumination of the ambient light is not less than the light illumination threshold:

when the average luminance value is less than a first luminance threshold, setting the second gamma lookup table as the output gamma lookup table;

when the average luminance value is greater than a second luminance threshold, setting the third gamma lookup table as the output gamma lookup table; and when the average luminance value is between the first luminance threshold and the second luminance threshold, setting the fourth gamma lookup table as the output gamma lookup table.

5. The image display method according to claim 4, wherein the step of generating the adjusted pixel luminance value corresponding to each of the pixel luminance values based on the output gamma lookup table so as to accordingly display the preview image on the screen comprises:

normalizing the pixel luminance values according to the maximum luminance value and the minimum luminance value so as to generate a plurality of normalized pixel luminance values;

inputting the normalized pixel luminance values to the output gamma lookup table so as to generate the adjusted pixel luminance values; and mapping the adjusted pixel luminance values to a display range of the screen so as to display the preview image on the screen accordingly.

6. An electronic device, comprising:

a screen;

an image capturing device, generating a preview image;

an image signal processor, coupled to the image capturing device, processing the preview image so as to generate a plurality of pixel luminance values of the preview image;

a light sensor, detecting a light illumination of an ambient light; and a controller, coupled to the screen, the image signal processor, and the light sensor, wherein the controller generates a luminance distribution of the luminance values, calculates an average luminance value according to the luminance distribution, selects an output gamma lookup table from a plurality of gamma lookup tables according to the average luminance value and the light illumination of the ambient light, and generates an adjusted pixel luminance value corresponding to each of the pixel luminance values based on the output gamma lookup table so as to accordingly display the preview image on the screen.

7. The electronic device according to claim 6, wherein the gamma lookup tables comprise:

a first gamma lookup table, wherein the first gamma lookup table is constructed according to a first gamma curve, and wherein a gamma value of the first gamma curve is equal to 1;

a second gamma lookup table, wherein the second gamma lookup table is constructed according to a second gamma curve, and wherein a gamma value of the second gamma curve is less than 1;

a third gamma lookup table, wherein the third gamma lookup table is constructed according to a third gamma curve, and wherein a gamma value of the third gamma curve is greater than 1; and a fourth gamma lookup table, wherein the fourth gamma lookup table is constructed according to a sigmoid curve.

8. The electronic device according to claim 7, wherein the controller further calculates a maximum luminance value and a minimum luminance value according to the luminance distribution.

9. The electronic device according to claim 8, wherein when the controller determines that the light illumination of the ambient light is less than a light illumination threshold, the controller sets the first gamma lookup table as the output gamma lookup table; and when the controller determines that the light illumination of the ambient light is not less than the light illumination threshold:

when the controller determines that the average luminance value is less than a first luminance threshold, the controller sets the second gamma lookup table as the output gamma lookup table;

when the controller determines that the average luminance value is greater than a second luminance threshold, the controller sets the third gamma lookup table as the output gamma lookup table; and when the controller determines that the average luminance value is between the first luminance threshold and the second luminance threshold, the controller sets the fourth gamma lookup table as the output gamma lookup table.

10. The electronic device according to claim 9, wherein the controller normalizes the pixel luminance values according to the maximum luminance value and the minimum luminance value so as to generate a plurality of normalized pixel luminance values, inputs the normalized pixel luminance values to the output gamma lookup table so as to generate the adjusted pixel luminance values, and maps the adjusted pixel luminance values to a display range of the screen so as to display the preview image on the screen accordingly.

* * * * *